US009024106B2

(12) United States Patent
Kuo et al.

(10) Patent No.: US 9,024,106 B2
(45) Date of Patent: *May 5, 2015

(54) DEGRADATION OF PHOSPHATE ESTERS BY HIGH OXIDATION STATE MOLYBDENUM COMPLEXES

(71) Applicants: Louis Y. Kuo, Portland, OR (US); Yusef A. Shari'ati, Portland, OR (US)

(72) Inventors: Louis Y. Kuo, Portland, OR (US); Yusef A. Shari'ati, Portland, OR (US)

(73) Assignee: Lewis & Clark College, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/905,381

(22) Filed: May 30, 2013

(65) Prior Publication Data
US 2014/0357928 A1  Dec. 4, 2014

(51) Int. Cl.
*A62D 3/36* (2007.01)
*A62D 3/38* (2007.01)
*A62D 3/30* (2007.01)
*A62D 3/35* (2007.01)
*B09C 1/00* (2006.01)
*A62D 101/04* (2007.01)
*A62D 101/28* (2007.01)
*A62D 101/26* (2007.01)
*A62D 101/02* (2007.01)

(52) U.S. Cl.
CPC .............. *A62D 3/38* (2013.01); *A62D 2101/04* (2013.01); *A62D 2101/28* (2013.01); *A62D 2101/26* (2013.01); *A62D 3/30* (2013.01); *A62D 3/35* (2013.01); *B09C 1/00* (2013.01); *A62D 2101/02* (2013.01)

(58) Field of Classification Search
CPC ....................................... A62D 3/36
USPC .......................... 588/401, 402, 313, 318, 901
See application file for complete search history.

(56) References Cited

U.S. PATENT DOCUMENTS 6,723,891 B1  4/2004  Wagner et al.
7,868,220 B2  1/2011  Kuo

OTHER PUBLICATIONS

Adint, Tyler, "Hydrolysis of VX structural mimic using molybdocene and other metal compounds", May 3, 2007, Thesis presented to Department of Chemistry, 37 pages.
Ahmed, Takiya J. et al., "Organometallic Catalysis in Aqueous Solution. They Hydrolytic Activity of a Water-Soluble ansa-Molybdocene Catalyst", Organometallics 2007, 26, pp. 5179-5187.
Chanda, Arani et al., "Total Degradation of Fenitrothion and Other Organophosphorus Pesticides by Catalytic Oxidation Employing Fe-TAML Peroxide Activators", J. Am. Chem. Soc. 2006, 128, pp. 12058-12059.
Keizer, Timothy S. et al., "Catalytic Dealkylation of Phosphates with Binuclear Boron Compounds", J. Am. Chem. Soc. 2002, vol. 124, No. 9, pp. 1864-1865.
Koca, Jaroslav et al., "Mobility of the Active Site Bound Paraoxon and Sarin in Zinc-Phosphotriesterase by Molecular Dynamics Simulation and Quantum Chemical Calculation", J. Am. Chem. Soc. 2001, 123, pp. 817-826.
Lewis, Vincent E., "Mechanism and Stereochemical Course at Phosphorus of the Reaction Catalyzed by a Bacterial Phosphotriesterase", Biochemistry 1988, 27, pp. 1591-1597.
Michalkova, A. et al., "Adsorption of Sarin and Soman on Dickite: An ab Initio ONIOM Study", J. Phys. Chem. B 2004, 108, pp. 1918-1930.
Michalkova, A. et al., "Theoretical Study of the Adsorption and Decomposition of Sarin on Magnesium Oxide", J. Phys. Chem. B 2004, 108, pp. 5294-5303.
Mortland, M. M., et al., "Catalytic Hydrolysis of Some Organic Phosphate Pesticides by Copper (II)", Hydrolysis of Phosphate, Department of Soil Science, vol. 15, No. 1, Jan.-Feb. 1967, pp. 163-167.
Moss, Robert A. et al., "Stereochemical Study of Phosphonothioate Cleavage by a Metallomicelle", Organic Letters, 2002, vol. 4, No. 11, pp. 1835-1838.
Moss, Robert A. et al., "Cleavage of VX Simulants by Micellar Iodoso- and Iodoxybenzoate", Langmuir 1999, 15, pp. 2738-2744.
Moss, Robert A. et al., "Kinetics of Cleavage of Thiophosphates and Phosphonothioates by Micellar Iodosocarboxylates and Copper Metallomicelles", Langmuir 2000, 16, pp. 6485-6491.
Smolen, Jean M. et al., "Divalent Metal Ion-Catalyzed Hydrolysis of Phosphorothionate Ester Pesticides and Their Corresponding Oxonates", Environ. Sci. Technol. 1997, 31, pp. 1664-1673.
Torrets, Alba et al., "Oxide Surface-Catalyzed Hydrolysis of Carboxylate Esters and Phosphorothioate Esters", Soil Sci. Soc. Am. J., (1994), 58:738-745.
Tsang, Josephine S. et al., "Billion-fold Acceleration of the Methanolysis of Paraoxon Promoted by La(OTf)3 in Methanol", J. Am Chem. Soc. 2003, 125, pp. 7602-7607.
Vanhooke, Janeen L. et al., "Three-Dimensional Structure of the Zinc-Containing Phosphotriesterase with the Bound Substrate Analog Diethyl 4-Methylbenzyphosphonate", Biochemistry 1996, 35, pp. 6020-6025.
Wagner, George W. et al., "Reactions of VX, GD, and HD with Nanosize MgO", J. Phys. Chem. B 1999, 103, pp. 3225-3228.

(Continued)

*Primary Examiner* — Edward Johnson
(74) *Attorney, Agent, or Firm* — McKee, Voorhees & Sease, P.L.C.

(57) ABSTRACT

Degradation of phosphate esters, particularly neurotoxins and pesticides, is performed using high oxidative state molybdenum complexes, more particularly molybdenum (VI) complexes. A molybdenum(VI) complex is dissolved in water and then reacted with a phosphate ester. The phosphate esters can include, but are not limited to, VX, VE, VG, VM, GB, GD, GA, GF, parathion, paraoxon, triazophos, oxydemeton-methyl, chlorpyrifos, fenitrothion and pirimiphos-methyl, representing both chemical warfare agents as well as pesticides and insecticides.

14 Claims, 3 Drawing Sheets

(56) References Cited

OTHER PUBLICATIONS

Wagner, George W. et al., "Reactions of VX, HD, and Their Simulants, with NaY and AgY Zeolites. Desulfurization of VX and AgY", Langmuir 1999, 15, pp. 8113-8118.

Wan, Hai Ben et al., "Mercury(II) Ion-Promoted Hydrolysis of Some Organophosphorus Pesticides", Pestic Sci. 1994, 42, pp. 93-99.

Yang, Yu-Chu et al., "Autocatalytic Hydrolysis of V-Type Nerve Agents", J. Org. Chem. 1996, 61, pp. 8407-8413.

Yang, Yu-Chu, "Chemical Detoxification of Nerve Agent VX", Acc. Chem. Res. 1999, 32, pp. 109-115.

Yang, Yu-Chu et al., "Perhydrolysis of Nerve Agent VX", J. Org. Chem. 1993, 58, pp. 6964-6965.

Kuo, Louis Y., et al., "Phosphonothioate Hydrolysis Turnover by Cp2MoCl2 and Silver Nanoparticles", Organometallics, 2012, 31, 5294-5301.

Kuo, Louis, Y., et al., "Stereochemical Inversion of Phosphonothioate Methanolysis by La(III) and Zn(II): Mchanistic Implications for the Degradation of Organophosphate Neurotoxins", Inorganic Chemistry, 2012, 51, 328-335.

Kuo, L.Y., et al., "Phosphonothioate hydrolysis through selective P—S bond scission by molybdenum metallocenes", Main Group Chemistry, 2010, 9, 283-295.

Kuo, Louis, Y., et al., "Degradation of a VX Analogue: First Organometallic Reagent to Promote Phosphonothioate Hydrolysis Through Selective P—S Bond Scission", Organometallics, 2008, 27, 2560-2564.

Kuo, Louis Y., et al., "P—S Bond Scission by Bis(cyclopentadienyl)molybdenum(IV) Dichloride, Cp2MoCl2(aq): First Documented Example of an Organometallic Complex Hydrolyzing Thiophosphinates", Inorganic Chemistry, 2005, 44, 5537-5541.

Kuo, Louis Y., et al., "Paraoxon and Parathion Hydrolysis by Aqueous Molybdenocene Dichloride (Cp2MoCl2): First Reported Pesticide Hydrolysis by an Organometallic Complex", Inorganic Chemistry, 2000, 39, 2103-2106.

Filowitz, M., et al., "17O Nuclear Magnetic Resonance Spectroscopy of Polyoxometalates. 1. Sensitivity and Resolution", Inorganic Chemistry, 1979, 18, 93-103.

Pedrosa, Maria R., et al., "Unprecedented Rearrangement of Molybdenum(VI) Oxide to (u2-Oxido)-bis[thoxidomolybdenum(VI)] Hexamolybdate", Eur. J. Inorganic Chemistry, 2007, 3952-3954.

Ho, Phuong Hien, et al., "Hydrolysis of Serine-Containing Peptides at Neutral pH Promoted by [MoO4]2-Oxyanion", Inorganic Chemistry, 2011, 50, 12025-12033.

Absillis, Gregory, et al., "Polyoxomolybdate Promoted Hydrolysis of a DNA-Model Phosphoester Studied by NMR and EXAFS Spectroscopy", Inorganic Chemistry, 2011, 50, 11552-11560.

Cartuyvels, Els, et al., "Questioning th eparadigm of metal complex promoted phosphodiester hydrolysis: [Mo7O24]6-polyoxometalate cluster as an unlikely catalyst for the hydrolysis of a DNA model substrate", Chem. Commun., 2008, 85-87.

Absillis, Gregory, et al., "Hydrolytic Cleavage of an RNA-Model Phosphodiester Catalyzed by a Highly Negatively Charged Polyoxomolybdate [Mo7O24]6-Cluster", J. Am. Chem. Soc., 2008, 130, 17400-17408.

DEGRADATION OF PHOSPHATE ESTERS BY HIGH OXIDATION STATE MOLYBDENUM COMPLEXES

GRANT REFERENCE

This invention was made with government support under Contract No. 0956740 NSF-RUI, awarded by the National Science Foundation. The government has certain rights in the invention.

BACKGROUND OF THE INVENTION

1. Field of the Invention

The present invention relates in general to a method for the degradation of phosphate esters, particularly neurotoxins and pesticides, by high oxidation molybdenum compounds. The degradation of organophosphorus compounds such as phosphate esters are necessary to dispose of the unwanted phosphate esters, for purposes including but not limited to destroying existing supplies of phosphate esters and remediating contaminated soil and water.

2. Problems in the Art

Phosphate esters include numerous chemical warfare agents such as VX, pesticides and insecticides, further including paraoxon and parathion. Each of these compounds includes a phosphate ester bond, and irreversibly blocks a serine hydroxyl group within the enzyme acetylcholinesterase by phosphorylation, resulting in a disruption of a cell's neurologic function. VX (O-ethyl-S[2-(diisopropylamino)ethyl]methylphosphonothioate) is a lethal phosphonothioate neurotoxin (LC50=0.135 mg/kg) with the formula

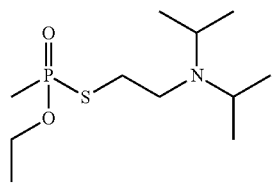

VX

Symptoms of exposure to VX include coughing, difficulty breathing, sweating, vomiting, urination/defecation, headache, tremors, unsteadiness and confusion, ultimately progressing to death. The United States has a stockpile of thousands of tons of VX that must be destroyed to comply with the Chemical Weapons Treaty of 1997. In addition, Russia is also known to possess quantities of VX.

Numerous phosphate esters are also used as pesticides which are toxic to unintended targets such as mammals. Examples include Paraoxon (O,O-diethyl-O-p-nitrophenylphosphoric acid) and Parathion (O,O-diethyl O-4-nitrophenyl phosphorothioate) with the respective formulas

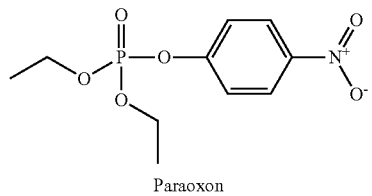

Paraoxon

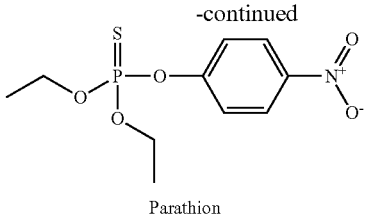

Parathion

Phosphate esters used as pesticides pollute soil and water with which they come in contact. The creation of phosphate esters for chemical warfare and use as pesticides results in the need for a safe and effective process of degradation in order to completely eliminate the compounds without persistent toxic environmental and medical effects. Much of the groundwork on degrading phosphate esters as nerve agents has been done on the pesticides paraoxon and parathion.

VX is degraded on a large scale by hydrolysis with concentrated aqueous sodium hydroxide, such as in 0.1 M NaOH, resulting in competing cleavage of the P—S and P—O esters, with approximately 87% P—S bond cleavage and 13% P—O bond cleavage (FIG. 1). This is problematic because the byproduct of the P—O bond cleavage, S-[2-(diisopropylamino)ethyl]methylphosphonic acid, has a toxicity comparable to VX and requires additional steps such as oxidative pretreatment for destruction. Caustic neutralization at 90° C. (16.6 wt. % VX, 8.8 wt. % NaOH, 74.6 wt. % $H_2O$) produces a similar ratio of bond cleavage, but allows S-[2-(diisopropylamino)ethyl]methylphosphonic acid to be broken down concurrently producing methyl phosphonic acid and thiolamine. However, this process requires specific control over both the pH and temperature of the reaction to ensure no byproducts are produced.

There is a need for a method to selectively cleave the P—S bond of the phosphate ester VX to eliminate the toxic byproducts of its degradation, so as not to require further degradation. Various additional aqueous compounds have been used in the degradation of VX, but are either unsuccessful at selectively cleaving the P—S bond or present commercial difficulties in their ability to be used in mass quantities. For example, aqueous potassium peroxymonosulfate selectively cleaves the P—S bond in VX. However, the solubility of potassium peroxymonosulfate is limited at low pH and the oxidant decomposes at any pH above 5. Alternatively, the use of potassium peroxymonosulfate in polar organic solvents generates a toxic diphosphonate as a major byproduct.

Magnesium oxide and alumina are reported to degrade VX, but these methods are limited to surface chemistry. Other degradation methods for phosphonothioates include incineration and oxidation with peroxides. Incineration is a politically unpopular degradation method. Alternatively, hydrolytic degradation of phosphonothioates lacks selectivity and results in both P—O and P—S degradation pathways, resulting in toxic byproducts.

The known methods to degrade phosphate ester pesticides include hydrolysis by microorganisms, degradation or hydrolysis by Cu (II), Hg(II) and clays, surface catalyzed hydrolysis by $Al_2O_3$, $TiO_2$ and FeOOH (goethite), and hydrolysis by Rh (III) and Ir (III) coordination complexes that are overly expensive and the hydrolysis by the molybdocene derivative, bis($\eta^5$-cyclopentadienyl)molybdenum (IV) dichloride ($Cp_2MoCl_2$). $Cp_2MoCl_2$ similarly hydrolyzes dimethyl phosphate, a phosphate ester that mimics the diester functionality of DNA.

The art in the field of the invention clearly illustrates an immediate need for a more selective degradation method for VX and related neurotoxins, as the safety and environmental impact of their degradation are of great concern to the public. There further exists a need to provide a degradation method for VX and related neurotoxins that does not produce toxic products. There is also a need for a degradation method for VX and related neurotoxins that operates at room temperature. There exists further a need for a degradation method for phosphate esters under conditions neither very acidic nor very basic, such as a pH between 4 and 10. There exists further a need to provide a faster method to degrade phosphate esters including neurotoxins and pesticides. Further still, there exists a need to provide methods and compositions for degradation of phosphonothionates that retain degredative active in the presence of sulfur containing byproducts of phosphonothionate degradation. More generally, there is a need for a fast and selective method to degrade phosphate esters. The present invention builds on past work with molybdenum metallocene catalysts to create a viable method of degrading phosphate esters.

BRIEF SUMMARY OF THE INVENTION

The present invention is related to a method of degrading phosphate esters, particularly neurotoxins and pesticides, by molybdenum metal oxides. The preferred molybdenum oxide complex is in a high oxidation state. In an even more preferred embodiment, the molybdenum oxide complex has an oxidation state of VI (+6). The method comprises dissolving a molybdenum(VI) complex in a water (pH 7-8) and reacting it with a phosphate ester. The phosphate esters can include, but are not limited to, VX, VE, VG, VM, GB, GD, GA, GF, parathion, paraoxon, triazophos, oxydemeton-methyl, chlorpyrifos, fenitrothion and pirimiphos-methyl, representing both chemical warfare agents as well as pesticides and insecticides.

The inventor has searched to find a method of degradation that results in the preferable chemical pathway of selective P—S bond scission, rather than P—O bond scission which produces a toxic byproduct requiring additional degradation steps. Further, the method of the invention uses high oxidation state molybdenum oxides that are air stable, which simplifies the degradation chemistry to point of making them practical under real-world (i.e. aerobic) conditions. Moreover, the methods of the invention are accomplished under neutral pH and do not require additives. In addition, the method of the invention prevents poisoning of the metal catalysts used, and therefore retains degredative activity in the presence of the sulfur-containing byproducts of degradation. The inventor has overcome the failures of prior art by enabling a commercially viable method of degrading phosphate esters.

DETAILED DESCRIPTION OF THE PREFERRED EMBODIMENT

Figure 1:
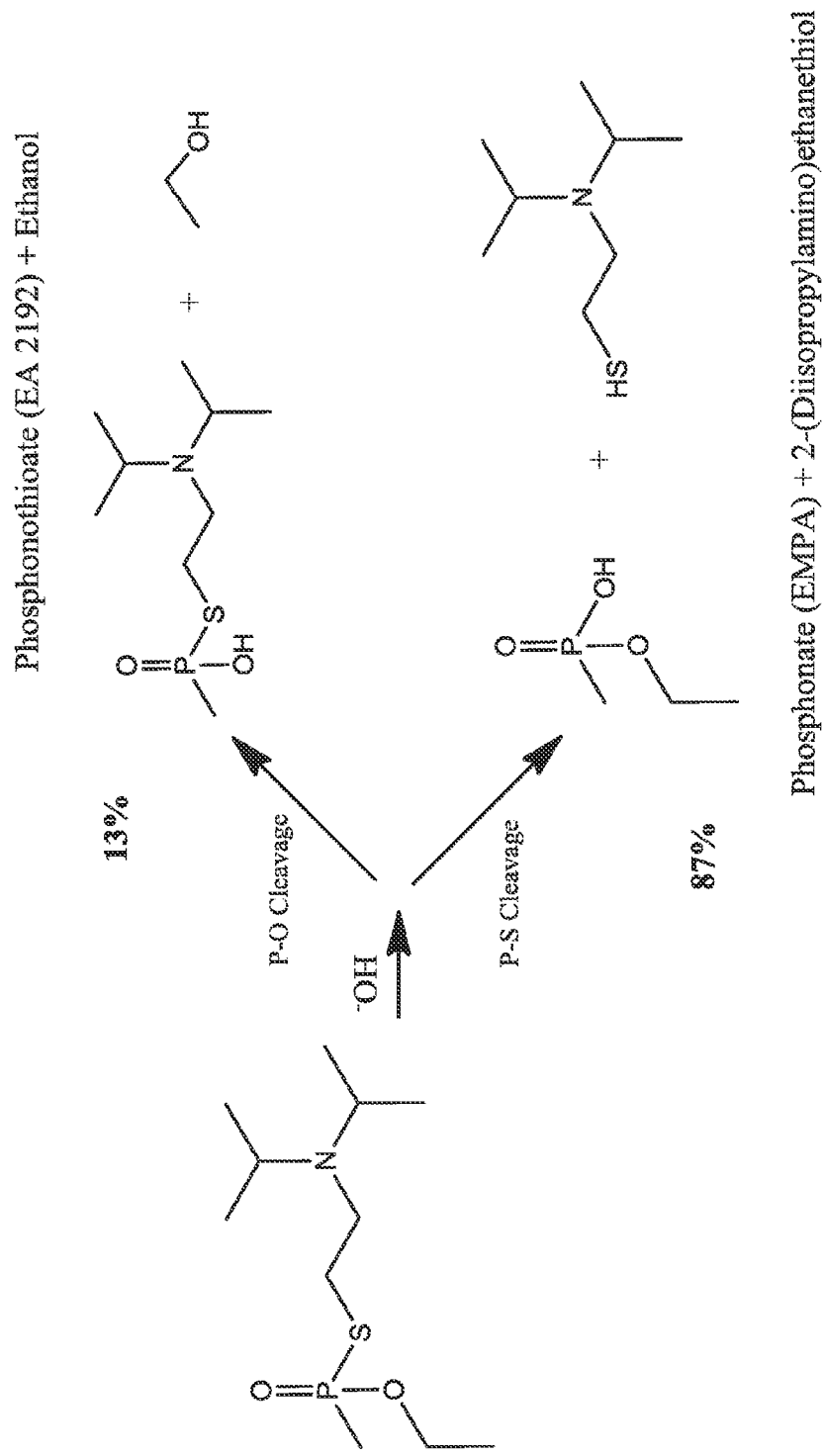
FIG. 1 illustrates VX degradation by aqueous base through two competing pathways.
Figure 2:
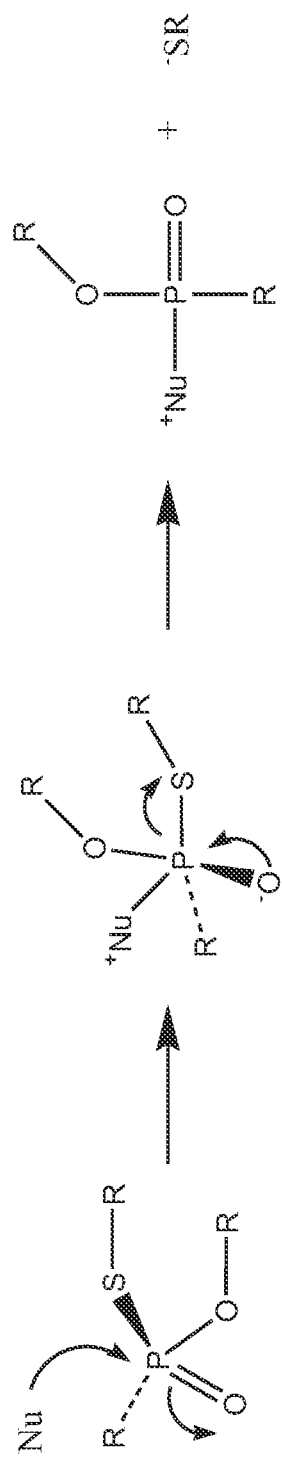
FIG. 2 illustrates the mechanism by which the P—S bond in a phosphonothioate is cleaved.
Figure 3:
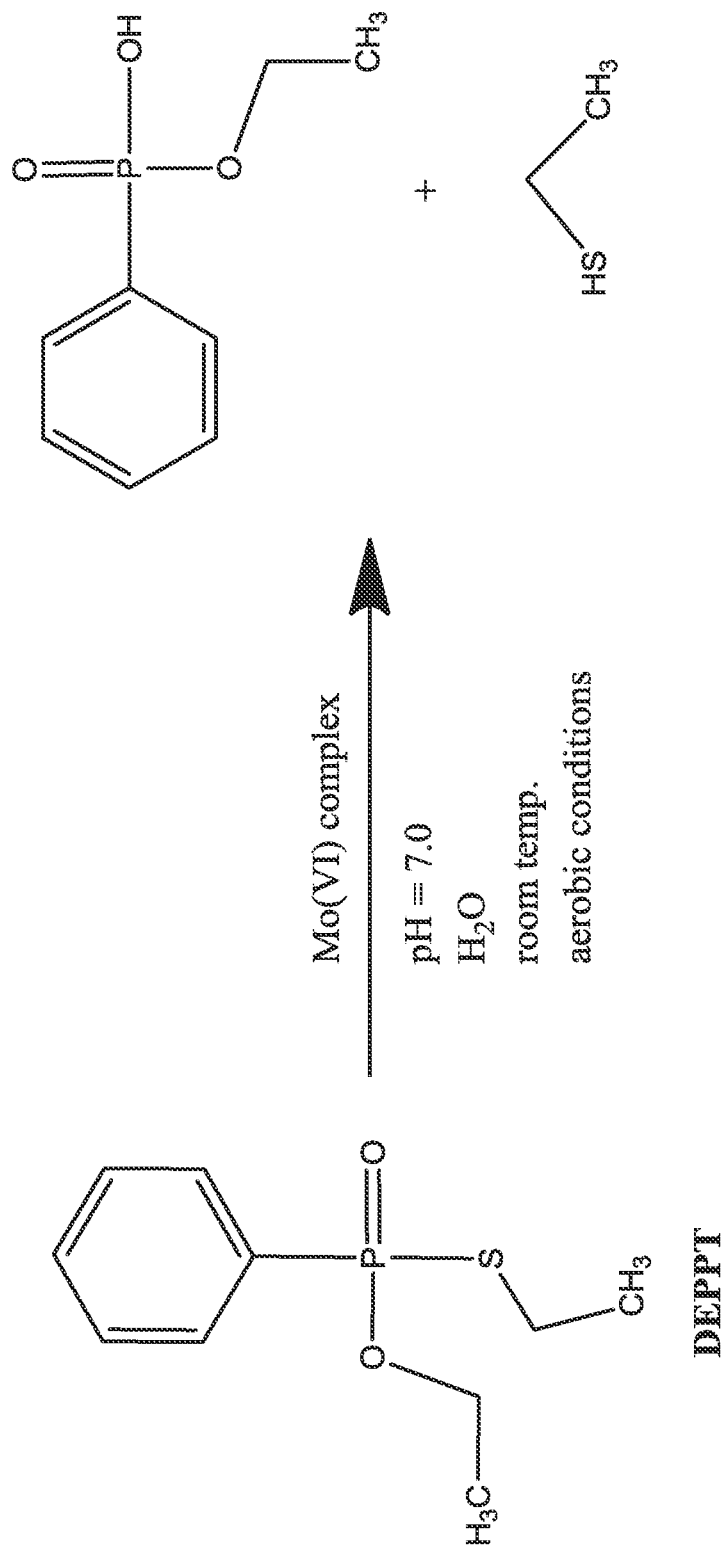
FIG. 3 illustrates the mechanism by which the P—S bond of O,S-diethyl phenylphosphonothioate (DEPP) is cleaved by the metal complexes molybdenum (VI).

In accordance with the purpose of the present invention described herein, a novel method is provided comprising: dissolving a molybdenum(VI) complex in water (pH 7-8); and reacting the molybdenum(VI) complex with a phosphate ester. One aspect of the present invention is to provide a fast and selective method for the degradation of phosphate esters. A further aspect of the present invention is to provide a method for the degradation of phosphate esters under conditions that are around neutral pH—neither very acidic nor very basic, such as a pH between 4 and 10.

A further aspect of the present invention is to provide a method for phosphate ester degradation in both aqueous and non-aqueous solvents once a compound is dissolved.

A further aspect of the present invention is to provide a method for the degradation of phosphate esters near ambient or room temperature.

A further aspect of the present invention is to provide a faster method for the degradation of phosphate esters.

A further aspect of the present invention is to provide a method for the degradation of phosphate esters to yield relatively non-toxic byproducts.

A further aspect of the present invention is to provide a method for the degradation of phosphate esters under aerobic conditions.

A further aspect of the present invention is to provide a method for the degradation of phosphate esters with turnover in water.

A further aspect of the present invention is to provide a method to destroy VX. A still further aspect of the present invention is to provide a method to destroy VX related neurotoxins. A still further aspect of the invention is to provide a method to destroy VX related neurotoxins to yield non-toxic byproducts. A still further aspect of the invention is to provide a method to destroy VX related neurotoxins under aerobic conditions, under aqueous conditions, under neutral pH, and/or at ambient or room temperature.

In yet another aspect of the present invention, a method to degrade phosphate ester pesticides is provided.

The method, in its simplest form, comprises the steps of dissolving a molybdenum(VI) complex in water and reacting the molybdenum(VI) complex with a phosphate ester.

This is the first example of molybdenum metal oxides that degrade phosphonothioate neurotoxins such as the chemical warfare agent VX in a selective fashion to yield relatively non-toxic byproducts. It is an example of a high oxidation molybdenum oxide that selectively degrades phosphonothioate insecticides. The current invention is done under aerobic conditions as the material is air stable. In addition, the degradation (hydrolysis) has turnover in pH 7-8 water. Both features—aerobic conditions and turnover—are new to prior molybdenum examples that degrade phosphonothioate neurotoxins in a benign fashion. The molybdenum complexes that carry out this transformation includes a variety of Mo(VI) oxygen systems that are currently being expanded.

Phosphate esters, for the purpose of this invention, include the following classes:

$$R^a\underset{R^b}{\overset{O}{\underset{\|}{P}}}\diagup O\diagdown R^c \qquad R^a\diagdown O\underset{\underset{R^b}{\overset{\|}{O}}}{\overset{S}{\underset{\|}{P}}}O\diagdown R^c$$

Phosphinate      Thiophosphate

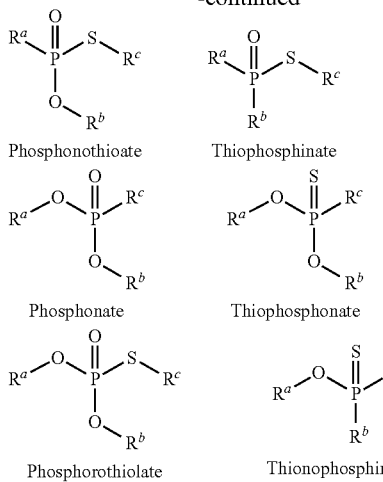

Phosphonothioate  Thiophosphinate

Phosphonate  Thiophosphonate

Phosphorothiolate  Thionophosphinate $R^a$-$R^c$ are selected from the group consisting of hydrogen atoms, halides, R, OR, OCOR, SR, $NR_2$ and $PR_2$. R is selected from the group consisting of linear, branched, saturated and unsaturated $C_1$-$C_{20}$ alkyl, $C_3$-$C_{20}$ cycloalkyl, $C_6$-$C_{20}$ aryl, $C_7$-$C_{20}$ alkylaryl, $C_7$-$C_{20}$ arylalkyl radicals, optionally containing one heteroatom and multiple heteroatoms belonging to groups 13-17 of the Periodic Table. $R^a$-$R^c$ may also be joined to form five-member and six-member rings which include P.

Molybdenum complexes of the present invention comprise molybdenum metal oxides wherein the molybdenum is in a +6 oxidation state (Mo(VI)). These Mo(VI) complexes include the following:

Molybdenum (VI) oxide (molybdenum trioxide; $MoO_3$):

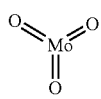

Bis(acetylacetonato)dioxomolybdenum (VI) ($MoO_2$(acac)$_2$; acac=acetylacetone):

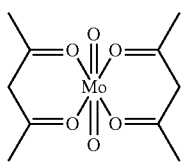

Hexamolybdate ($Mo_6O_{19}^{2-}$):

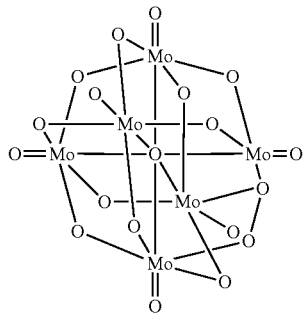

Molybdate (VI) salt of sodium or potassium ($X_2MoO_4$; X=Na or K):

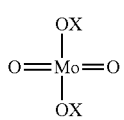

Heptamolybdate ($[Mo_7O_{24}]^{6-}$):

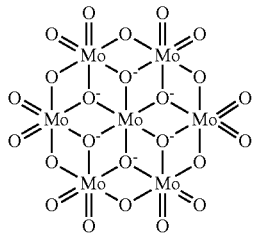

The Mo(VI) complexes of the present invention also include other non commercially available Mo(VI) oxides, including bis([dioxomolybdenum(VI)] complexes of the form $Mo_2O_5L_6$

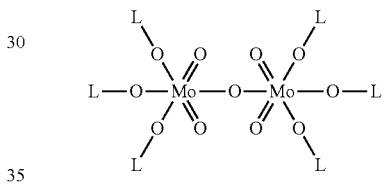

where L=$H_2O$, dimethylformamide, dimethylacetamide, dimethylsulfoxide, dibutyl sulfoxide, tributylphosphane oxide, triphenylphosphate oxide, or hexamethylphosphoramide.

The rate at which high oxidation state molybdenum complexes degrade phosphate esters is increased, compared to previous methods. While not being limited to any particular theory, it is believed the Mo(VI) core binds and activates the phosphate ester for subsequent nucleophilic attack by the water.

VX related neurotoxins include, but are not limited to, V and G series nerve agents. V series nerve agents include, but are not limited to, VX, VE (S-(Diethylamino)ethyl O-ethyl ethylphosphonothioate), VG (O,O-Diethyl-S-[2-(diethylamino)ethyl]phosphorothioate) and VM (O-Ethyl-S-[2-(diethylamino)ethyl]methylphosphonothioate). G series nerve agents include, but are not limited to, GB(O-Isopropyl methylphosphonofluoridate), GD (O-Pinacolyl methylphosphonofluoridate), GA (Ethyl N,N-dimethylphosphoramidocyanidate) and GF (cyclohexyl methylphosphonofluoridate)

Phosphate ester pesticides include, but are not limited to, parathion, paraoxon, triazophos (O,O-diethyl O-1-phenyl-1H-1,2,4-triazol-3-ylphosphorothioate), oxydemeton-methyl (S-2-(ethylsulfinylethyl O,O-dimethyl)phosphorothioate), chlorpyrifos (O,O-diethyl O-3,5,6-trichloro-2-pyridyl phosphorothioate), fenitrothion (O,O-dimethyl O-4-nitro-m-tolyl phosphorothioate) and pirimiphos-methyl (O-2-diethylamino-6-methylpyrimidin-4-yl O,O-dimethyl phosphorothioate).

Unlike prior work with molybdenum complexes in which the metal oxidation state was IV (+4), the present invention relates to high oxidation state molybdenum oxides that are air stable, which simplifies the degradation chemistry to the point of making them practical under real-world (i.e. aerobic) conditions. Moreover, the hydrolysis conditions are accomplished under neutral pH and do not require additives.

Finally, the leaving group for the hydrolyticdegredataion of phosphonotioates is sulfur containing compound that traditionally "poisons" metal catalysts. The high oxidation molybdenum complexes of the present invention have not shown any evidence of poisoning in water (pH 7) and therefore are still active in the presence of these sulfur containing byproduct. As such, the inventors have demonstrated that the degradation chemistry is catalytic in the molybdenum oxide complex. This further adds to the practical application of the invention, and represents a much needed improvement above prior Mo(1V) chemistry in this area of phosphonothioate degradation.

EXAMPLES

The following examples incorporate the following reaction conditions and parameters. These descriptions are intended to illustrate and not limit in any manner the present invention.

Phosphonothioates are a key functional group found in chemical warfare neurotoxins (i.e. VX) and insecticides. One of the current methods of degrading VX is through hydrolysis, but it yields a toxic byproduct, iisopropylaminoethylmethylphospohonothic acid. Using an analog of VX, we have shown that a class of high oxidation state molybdenum complexes degrade the VX-mimic to yield relatively non-toxic products. In addition to being the first example of molybdenum oxide compound that degrades phosphonothioate neurotoxins, this invention also offers a more viable way to carry out this degradation that is practical and safe.

Using DEPPT as a structural analog of VX allows examination of hydrolysis methods in a reasonable manner with similar chemical activity as VX. DEPPT contains both P—O and P—S bonds, making it ideal to examine where cleavage will take place if the technique is applied to other phosphonothioates.

The concentration is a significant parameter of the present invention. The specific volume is not a central limitation, rather the concentration and solubility of the metallocenes and organophosphorus compounds are important limits.

The temperature parameters for the molybdenum(VI) complexes are effectively limited to from 0° C. to 100° C. The aqueous solvent will freeze below 0° C. and significantly evaporate above 70° C. The temperature could be increased as high as 100° C. in a high pressure reactor to prevent evaporation.

Finally, all NMR-scale reactions do not require stirring to dissolve the Mo(VI) complex. Notably, a preparative scale would require stirring.

The following examples are presented to further illustrate, but not limit, the invention and to assist one of ordinary skill to practice the invention.

Example 1

Control

O,S-diethyl phenylphosphonothioate (DEPPT) is a phosphonothioate and a structural analogue of VX. DEPPT was dissolved in an aqueous or mixed alcohol-water solution and monitored by nuclear magnetic resonance (NMR) spectroscopy at 50° C. No degradation of DEPPT by P—S or P—O bond scission was observed.

Example 2

Hydrolysis of DEPPT with Mo(VI)

DEPPT was added to an excess of the Mo(VI) complex in an aqueous solution under aerobic conditions, pH=7, room temperature. The following reaction took place as determined by NMR spectroscopy:

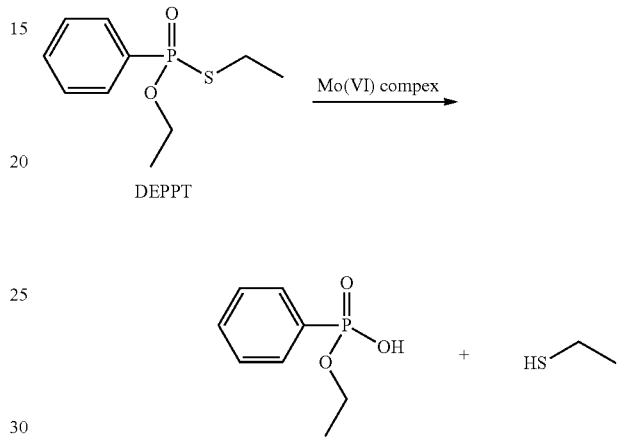

The result demonstrates that DEPPT was hydrolyzed by selective scission of the P—S bond by the Mo(VI) complex. The comparison to Example 1, the control study, demonstrates that the reaction causing the scission of the P—S bond is due to the action of the Mo(VI) complex.

What is claimed is:

1. A method for degrading a phosphate ester comprising:
   dissolving a molybdenum(VI) complex in water (pH 7-8); and
   reacting the molybdenum(VI) complex with a phosphate ester.

2. The method of claim 1 wherein the molybdenum(VI) complex is selected from the group consisting of:
   molybdenum(VI) oxide

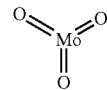

bis(acetylacetonato)dioxomolybdenum(VI)

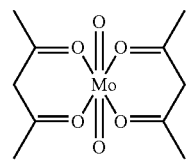

hexamolybdate

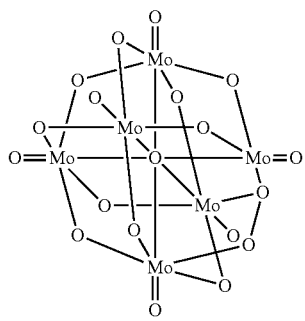

molybdate salt, wherein X is Na or K

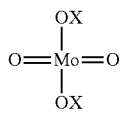

heptamolybdate

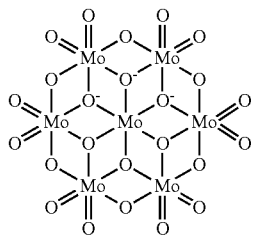

or bis([dioxomolybdenum(VI)]) complexes of the form $Mo_2O_5L_6$,

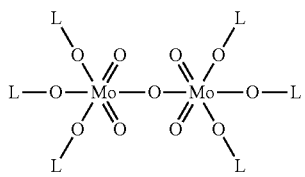

where L is:
$H_2O$
dimethylformamide

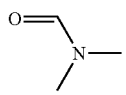

dimethylacetamide

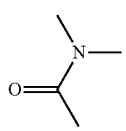

dimethylsulfoxide

dibutyl sulfoxide

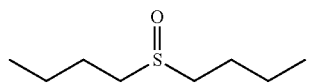

tributylphosphane oxide

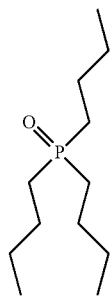

triphenylphosphate oxide

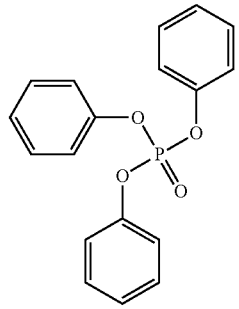 [SMILES: O=P(Oc1ccccc1)(Oc1ccccc1)Oc1ccccc1]

or hexamethylphosphoramide

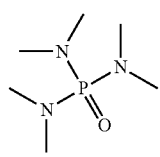

3. The method of claim 1 wherein the phosphate ester is selected from the group consisting of:

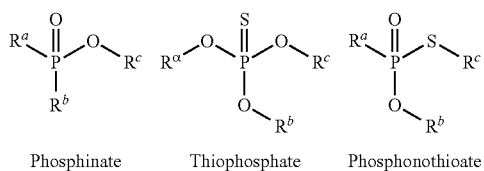

Phosphinate    Thiophosphate    Phosphonothioate

-continued

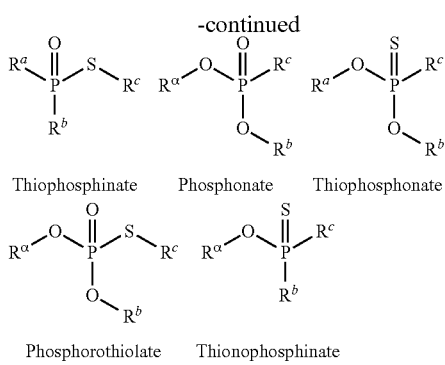

Thiophosphinate   Phosphonate   Thiophosphonate

Phosphorothiolate   Thionophosphinate

4. The method of claim 3 wherein $R^a$-$R^c$ may be joined to form five-member and six-member rings which include P, and are selected from the group consisting of hydrogen atoms, halides, R, OR, OCOR, SR, NR2 and PR2 wherein R is selected from the group consisting of linear, branched, saturated and unsaturated C1-C20 alkyl, C3-C20 cycloalkyl, C6-C20 aryl, C7-C20 alkylaryl, C7-C20 arylalkyl radicals.

5. The method of claim 4 wherein R contains at least one heteroatom belonging to groups 13-17 of the Periodic Table.

6. The method of claim 1 wherein said reacting the molybdenum(VI) complex with a phosphate ester is performed under aerobic conditions.

7. The method of claim 1 wherein said reacting the molybdenum(VI) complex with a phosphate ester is performed under aqueous conditions.

8. The method of claim 1 wherein said reacting the molybdenum(VI) complex with a phosphate ester is performed at around neutral pH.

9. The method of claim 1 wherein said reacting the molybdenum(VI) complex with a phosphate ester is performed at ambient temperature.

10. The method of claim 1 wherein said molybdenum(VI) complex retains activity after reacting with said phosphate ester.

11. The method of claim 1 wherein the phosphate ester is selected from the group consisting of VX, VE, VG, VM, GB, GD, GA, GF, parathion, paraoxon, triazophos, oxydemeton-methyl, chlorpyrifos, fenitrothion and pirimiphos-methyl.

12. A method for degrading a phosphate ester comprising:
dissolving a molybdenum(VI) complex in water; and
reacting the molybdenum(VI) complex with a phosphonothioate with the formula

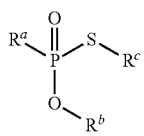

wherein the metallocene derivative is selected from the group consisting of molybdenum(VI) oxide

bis(acetylacetonato)dioxomolybdenum(VI)

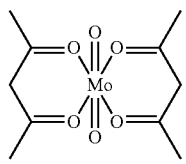

hexamolybdate

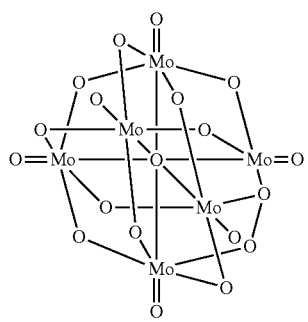

molybdate salt, wherein X is Na or K

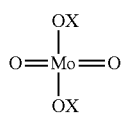

heptamolybdate

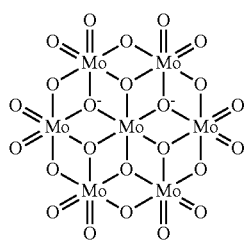

or bis([dioxomolybdenum(VI)]) complexes of the form $Mo_2O_5L_6$, with the following structure:

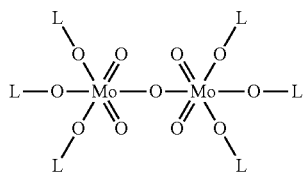

where L is selected from the group consisting of:
H₂O
dimethylformamide

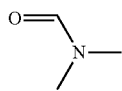

dimethylacetamide

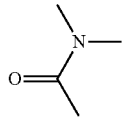

dimethylsulfoxide

dibutyl sulfoxide

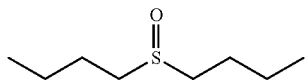

tributylphosphane oxide

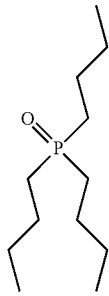

triphenylphosphate oxide

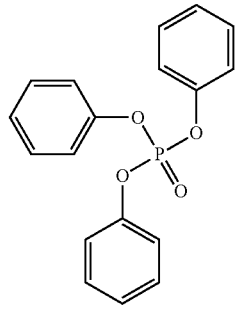 [SMILES: O=P(Oc1ccccc1)(Oc1ccccc1)Oc1ccccc1]

or hexamethylphosphoramide

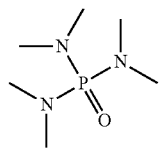

13. The method of claim 12 wherein $R^a$-$R^c$ may be joined to form five member and six-member rings which include P, and are selected from the group consisting of hydrogen atoms, halides, R, OR, OCOR, SR, NR2 and PR2 wherein R is selected from the group consisting of linear, branched, saturated and unsaturated C1-C20 alkyl, C3-C20 cycloalkyl, C6-C20 aryl, C7-C20 alkylaryl, C7-C20 arylalkyl radicals.

14. The method of claim 12 wherein the phosphate ester is selected from the group consisting of YX, YE, VG, VM, GB, GD, GA and GF.

* * * * *